United States Patent
Eldredge

(10) Patent No.: US 6,801,212 B1
(45) Date of Patent: Oct. 5, 2004

(54) APPARATUS AND METHOD FOR COLOR DATA INTERPOLATION

(75) Inventor: James G. Eldredge, Meridian, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 108 days.

(21) Appl. No.: 10/112,013

(22) Filed: Mar. 29, 2002

(51) Int. Cl.[7] .............................................. G09G 5/02
(52) U.S. Cl. .................................... 345/589; 345/606
(58) Field of Search ................................ 345/589, 591, 345/604, 606, 607, 608; 382/162

(56) References Cited

U.S. PATENT DOCUMENTS 4,275,413 A * 6/1981 Sakamoto et al. ............ 358/80
5,666,437 A * 9/1997 Vondran, Jr. ................. 382/167
2002/0080232 A1 * 6/2002 Hiratsuka et al. ............. 348/51
2002/0122207 A1 * 9/2002 Klassen et al. .............. 358/2.1
2003/0098986 A1 * 5/2003 Pop ............................. 358/1.9

* cited by examiner

Primary Examiner—Matthew C. Bella
Assistant Examiner—G. F. Cunningham
(74) Attorney, Agent, or Firm—Marger Johnson & McCollom, P.C.

(57) ABSTRACT

An interpolation scheme uses cubic subdivision to index a position of an input color value in a color space relative to neighboring vertices. The indexed position of the input color value is expanded and the neighboring vertices are combined together according to the expanded index to generate an output color value.

17 Claims, 8 Drawing Sheets

US 6,801,212 B1

APPARATUS AND METHOD FOR COLOR DATA INTERPOLATION

BACKGROUND

Certain image processing devices, such as printers, displays, image rendering systems and output files may use a different color space than other image processing devices such as a color driver for a computer system, camera, display or input graphics file. For example, a cyan, magenta, yellow, and black (CMYK) color space is used for a color printer. However, a red, green and blue (RGB) color space may be used for certain graphics files. Accordingly, a color transformation is needed for converting the RGB color space into the CMYK color space.

One method of color transformation uses a look-up table to store a plurality of color values associated with the CMYK color space. A conversion between the RGB color space and the CMYK color space is performed by indexing the CMYK values in the look-up table using addresses corresponding with RGB color values, one look-up table per output color.

A large amount of memory is required for the look-up table. For example, a 24-bit RGB color system may use 8 bits for red color values, 8 bits for green color values and 8 bits for blue color values. This 24-bit RGB color system can require a table size of 16 MegaBytes (MBs) or larger per output color.

To reduce memory requirements, some color transformation devices combine interpolation with the color mapping process. The hybrid transformation process first identifies a set of vertices that surround or neighbor an input color point in the color space. A value for the second color space is then derived by interpolating the identified vertices to the relative position of the input color point. However, this interpolation process is slow and computationally intensive.

SUMMARY

An interpolation scheme uses cubic subdivision to index a position of an input color value in a color space relative to neighboring vertices. The indexed position of the input color value is expanded and the neighboring vertices are combined together according to the expanded index to generate an output color value.

The foregoing and other objects, features and advantages of the invention will become more readily apparent from the following detailed description of a preferred embodiment of the invention, which proceeds with reference to the accompanying drawings.

DETAILED DESCRIPTION

Figure 1:
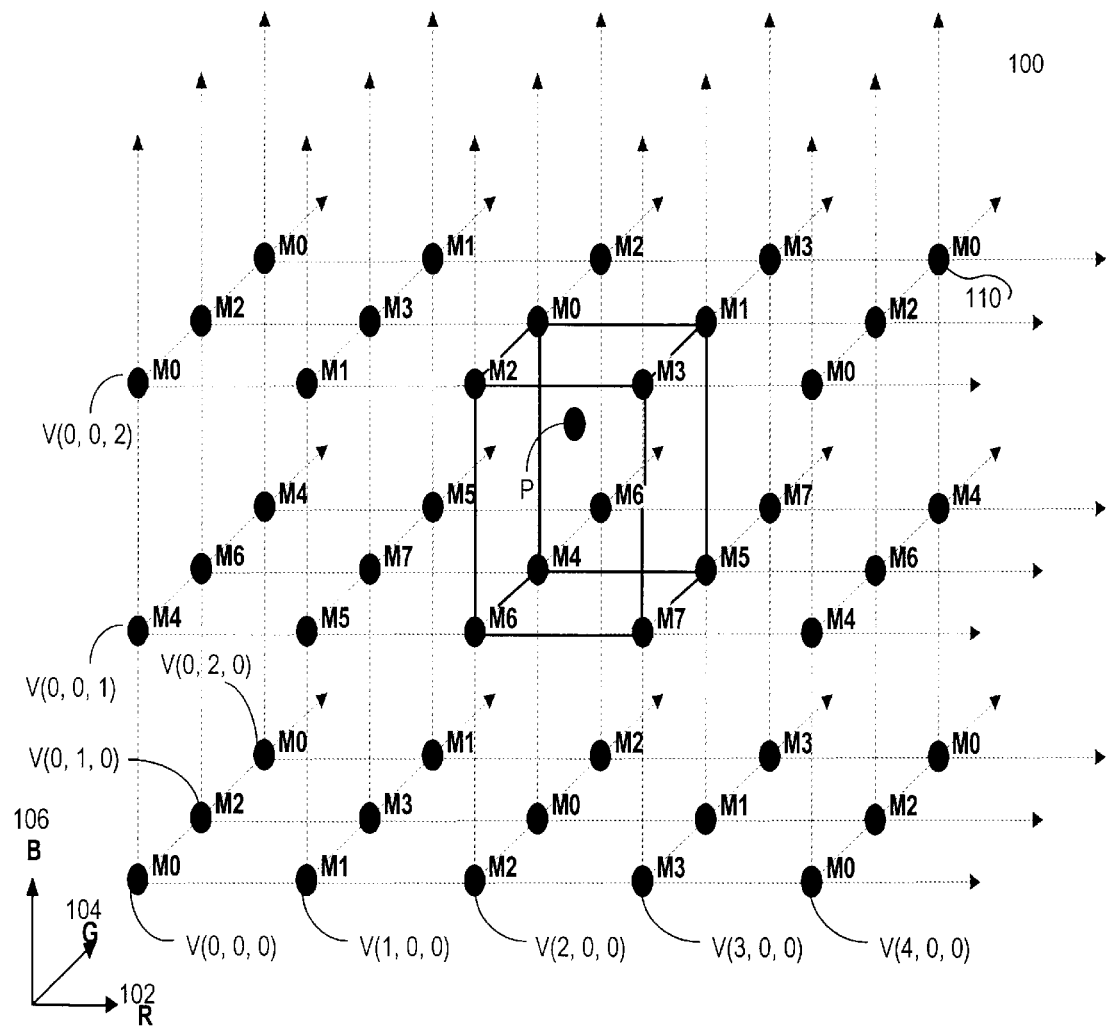
FIG. 1 shows the lattice points formed by samples of the output color at regular locations and illustrates the eight lattice points accessed for a given input value.
Figure 2:
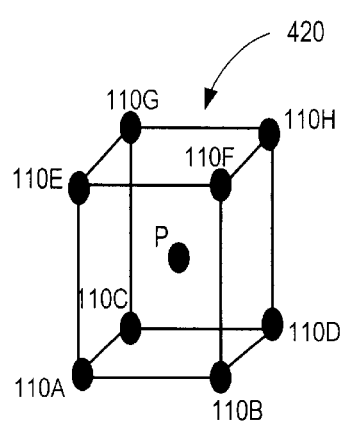
FIG. 2 shows vertices for a unit cell neighboring an input color value.

FIGS. 1 and 2 show a three dimensional color space 100. Various combinations of Red (R), Green (G) and Blue (B) components of the color space 100 are represented along separate x, y, and z-axes 102, 104, and 106, respectively. The color space 100 in one example is used for transforming an input RGB color value 108 into an output CYMK color value.

The references M0, M1, M2, M3 . . . M7 represent memories, sections of a memory, containing the lattice values for the color space 100. The eight vertices 110A–110H in FIG. 2 are identified for a unit cell 420 that contains the input RGB color value P. An interpolation can be performed using the eight lattice points 110A–110H to determine an output CMYK color value corresponding to the input RGB color value P.

Figure 3:
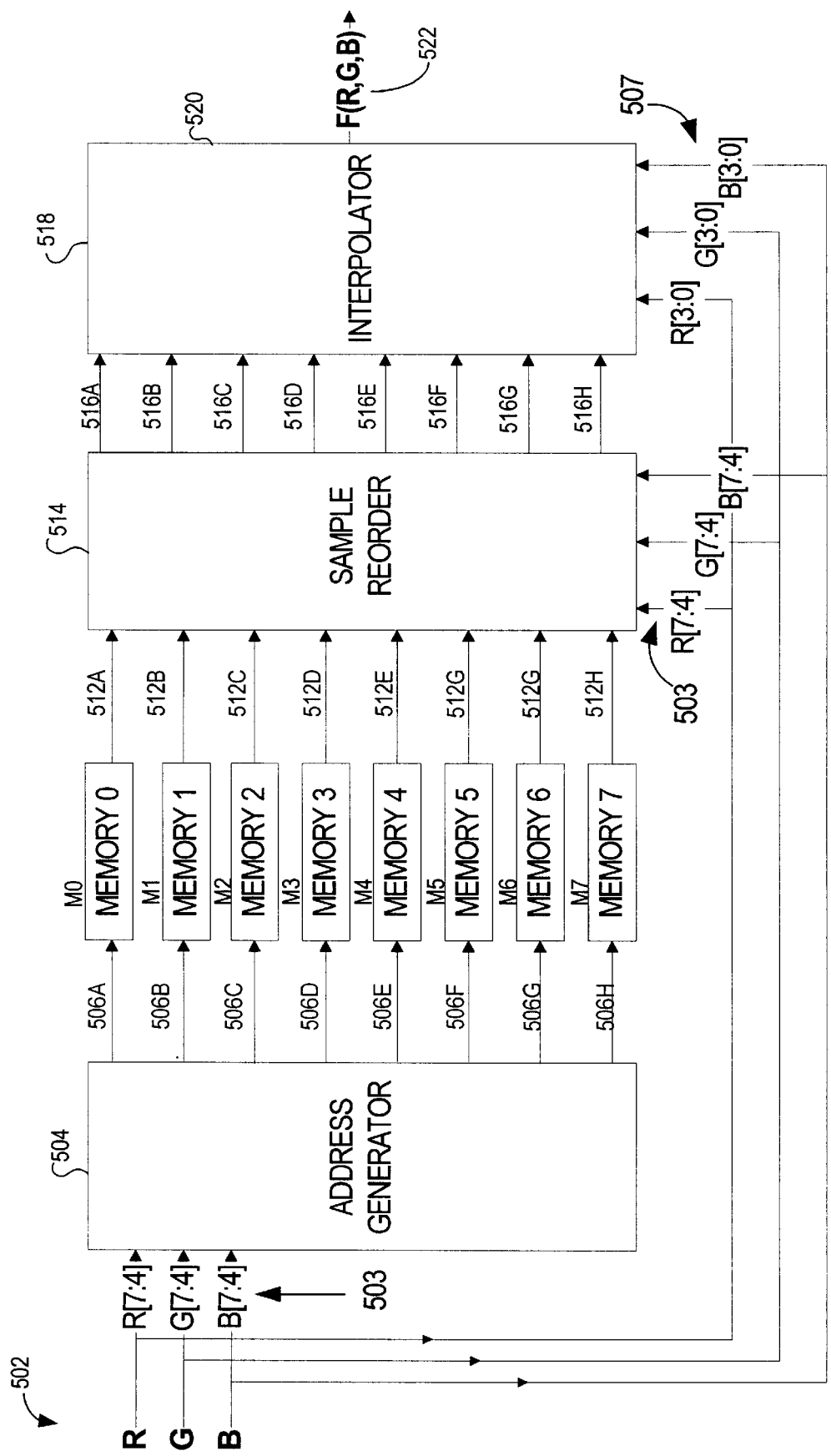
FIG. 3 is a block diagram of a color conversion circuit.

Referencing FIGS. 1–3, eight separate memories, or sections of memory, may be used to allow simultaneous access to the eight lattice point samples 110A–110H. Lattice points (samples) in FIG. 1 may be indexed relative to the x, y, and z axes 102, 104, 106 respectively. For example, the lattice point at the origin of color space 100 in FIG. 1 is referenced as V(0, 0, 0). The neighboring lattice point along the x-axis is referenced as V(1, 0, 0). The next remaining lattice points located sequentially along the x-axis are V(2, 0, 0), V(3, 0, 0) . . . V(15, 0, 0). Similarly, along the y-axis the lattice points are referenced as V(0, 0, 0), V(0, 1, 0), V(0, 2, 0) . . . V(0, 15, 0). Lattice points along the z-axis are referenced as V(0, 0, 0–15).

In the example shown in FIG. 1, four sequential lattice points V(0–3,0,0) along the x-axis are assigned to sequentially referenced memories M0, M1, M2 and M3, respectively. The assignment of lattice points sequentially in memories M0–M3 continues along the x-axis 102. For example, lattice points V(4–7, 0, 0) are assigned to memories M0–M3, respectively. Similarly, lattice points V(8–11, 0,0) are assigned to memories M0–M3, respectively, and lattice points V(12–15, 0, 0) are assigned to memories M0–M3, respectively.

In a next vertical plane, lattice points V(0–15,1,0) along the x-axis may be assigned to memories M2, M3, M0, M1, respectively. For example, lattice points V(0–3, 1, 0) are assigned to memories M2, M3, M0, M1, respectively; lattice points V(4–7, 1, 0) are assigned to memories M2, M3, M0, M1 respectively; lattice points V(8–11, 1, 0) are assigned to memories M2, M3, M0, M1, respectively; and lattice points V(12–15, 1, 0) are assigned to memories M2, M3, M0, M1, respectively. The lattice points V(0–15, 2, 0) along the x-axis in the next vertical plane may be assigned to memories in the sequence M0–M3 similar to the vertices V(0–15, 0, 0).

The lattice points are also assigned sequentially to memories along the x-axis of a next upper horizontal plane. For example, lattice points V(0–3, 0, 1) are assigned to memories M4, M5, M6, M7, respectively. The remaining lattice points along this x-axis are assigned in similar sequential fashion to memories M4–M7, respectively.

Lattice points along the y and z axes of the color space 100 may be assigned to memories in a mirrored relationship about an intersecting axis. For example, lattice point V(0, 0, 1) is assigned to memory M4. On opposite sides of the x-axis V(0–15, 0, 1) that passes through lattice point V(0, 0, 1), the lattice points V(0, 0, 0) and V(0, 0, 2) are each assigned to memory M0. Likewise, lattice points immediately above and below lattice point V(0, 0, 2) are both assigned to the same memory M4. A similar mirrored relationship may exist along the y-axis 104. For example, lattice point (0, 1, 0) is assigned to memory M2. The lattice points V(0, 0, 0) and V(0, 2, 0), on opposite sides of V(0, 1,0), are both assigned to memory M0.

This mirrored relationship of vertex assignments along the y-axis and z-axis about an intersecting axis may be described alternatively as establishing same memory assignments to alternating vertices along the y-axis and also along the z-axis.

It should be understood that this is only one example of how memories can be assigned to the lattice points in the color space 100. Other assignment schemes can also be used. For example, more or less than 4 sequential memories can be assigned to sequential lattice points along the x-axis. And other memory assignments, other than the alternating scheme, can be used for the lattice points along the y-axis and the z-axis.

FIG. 3 shows a system for converting an input color value into an output color value. A set of RGB input color values 502 arrives encoded as three 8-bit words. Red may be represented by 8 bit word R[7:0], green by G[7.0] and blue by B[7:0]. The input RGB color data 502 may be divided into an upper 4-bit portion 503 and a lower 4-bit portion 507. This is convenient because in one example, the color space may be sampled at every sixteen units along each of the R-axis, G-axis, and B-axis. The upper 4-bits 503 of the RGB input color value 502 identifies the unit cube 420 (FIG. 2) containing the input RGB color point P. The lower 4-bits 507 identify where the input RGB point P is located inside the unit cube 420.

Of course, the bit lengths described above are only one example of how the input color data may be converted to output color data. The number of bits used in portions 503 and 507 may be different for different applications, and the number of bits used for the RGB input color data 502 may also be different for different applications.

Further referencing FIG. 3, an address generator 504 receives the upper bits 503 of the RGB input data 502 and generates eight separate addresses 506A–506H for memories M0–M7, respectively. The memories M0–M7 contain the lattice points for the color space 100 shown in FIG. 1. It should be understood that the memories M0–M7 may comprise any type of memory such as, e.g., DRAM, SRAM, RAM, ROM or other volatile or non-volatile memory types. In another embodiment, the memories M0–M7 represent different sections of the same memory.

Address Generation

In one particular example, the address generator 504 may use the upper four bits R[7:4], G[7:4] and B[7:4] of the input RGB data 502 to generate addresses 506A–506H. A set of x, y and z coordinate data may be related to an RGB color space through the following equations:

$$z=R[7:4] \quad \text{Equation 2.1}$$

$$y=G[7:4] \quad \text{Equation 2.2}$$

$$x=B[7:4] \quad \text{Equation 2.3}$$

A variable m represents a particular one of the memories M0–M7. In this example, variable m may comprise one of the integer values 0, 1, 2, 3, 4, 5, 6, or 7. A mode value may be determined as follows.

$$\text{mode}=m-((4z+2y+x)\%8) \quad \text{Equation 3.0}$$

The notation "%" represents a modulus (remainder) operation. For example, 11%8 is equal to 3 and 16%8 is equal to 0.

Variables x, y, z may be redefined as new variables as follows:

$$z'=z+\text{mode}[2] \quad \text{Equation 4.0}$$

$$y'=y+\text{mode}[1] \quad \text{Equation 4.1}$$

$$x'=x+\text{mode}[0] \quad \text{Equation 4.2}$$

Using variables x', y', z', the addresses 506A–506H may be determined by equation 5.0 as follows:

$$A(m)=C0(z'/2)+C1(z'\%2)+C2(y'/4)+C3(y'\%4)+(z'[0]?(y'\%4>C4):(y'\%4>C5))+x'/8$$

The expression (z'[0]?(y' %4>C4):(y' %4>C5)) represents an if-then-else function as follows:
IF (z'[0]==1) THEN
return (y' %4>C4)
ELSE
return (y' %4>C5).

The expression "return (y' 4>C4)" generates a "1" value when y' % 4 is greater than C4 and otherwise generates a "0" value. Similarly, the expression "return (y' %4>C5)" generates a "1" value when y' % 4 is greater than C5 and, otherwise, generates a "0" value.

For the address A(m) determination of equation 5.0, variables C0, C1, C2, C3, C4 and C5 assume values for particular memories m as shown in table 1.0.

TABLE 1.0

| m | C0 | C1 | C2 | C3 | C4 | C5 |
|---|----|----|----|----|----|----|
| 0 | 77 | 39 | 9  | 2  | 2  | 2  |
| 1 | 68 | 34 | 8  | 2  | 3  | 3  |
| 2 | 76 | 38 | 9  | 2  | 3  | 1  |
| 3 | 68 | 34 | 8  | 2  | 3  | 3  |
| 4 | 77 | 38 | 9  | 2  | 0  | 2  |
| 5 | 68 | 34 | 8  | 2  | 3  | 3  |
| 6 | 76 | 38 | 9  | 2  | 1  | 3  |
| 7 | 68 | 34 | 8  | 2  | 3  | 3  |

Sample Reorder

As previously shown in FIGS. 1–2, different memories may provide different lattice points (alternative expression for vertices) for different unit cubes 420. For example, memory M6 may contain a lattice point for a lower front left corner of the identified unit cube. For a different input RGB data point, memory M6 may contain a lattice point for an upper back left corner relative to the identified unit cube.

FIG. 3 shows a sample reorder circuit 514 that reorders the lattice points output from memories M0–M7 into a common order for any unit cube 420 (FIG. 2). For example, sample reorder circuit 514 may reorder the lattice points so that output 516A always outputs the lattice point for the front lower left corner for all unit cubes output from memories M0–M7.

The sample reorder circuit 514 arranges the lattice points 512A–512H output by the memories M0–M7 according to the upper bits R[7:4], G[7:4] and B[7:4] of the input RGB color data 502. The lattice points 512A–512H in one implementation are reordered according to equations 6.0 and 7.0. Of course, other reordering schemes can also be used. The lattice points 516A–516H are referred to as vertices V(n) in equation 6.0 and the memories M0–M7 are referred to as R as follows:

$$V(n)=R((n+g)\%8) \quad \text{Equation 6.0}$$

The term g is defined as follows:

$$g=((z[0]*2)+y[1:0])*2+x[2:0] \quad \text{Equation 7.0}$$

The x, y, z values are derived from equations 2.1–2.3 above. The term $z[0]$ refers to the least significant bit of z, $y[1:0]$ refers to the two least significant bits of y, and $x[2:0]$ refers to the three least significant bits of x. For example, a value of 6 may be generated for variable g. The memory containing the third lattice point for the unit cube could be derived as follows:

$$V(3)=R(9\%8) \quad \text{Equation 7.1}$$

$$V(3)=R(1) \quad \text{Equation 7.2}$$

Accordingly, in this example, memory M1 outputs the third lattice point of the eight corner unit cube output from the memories M0–M7.

Interpolation

Figure 4:
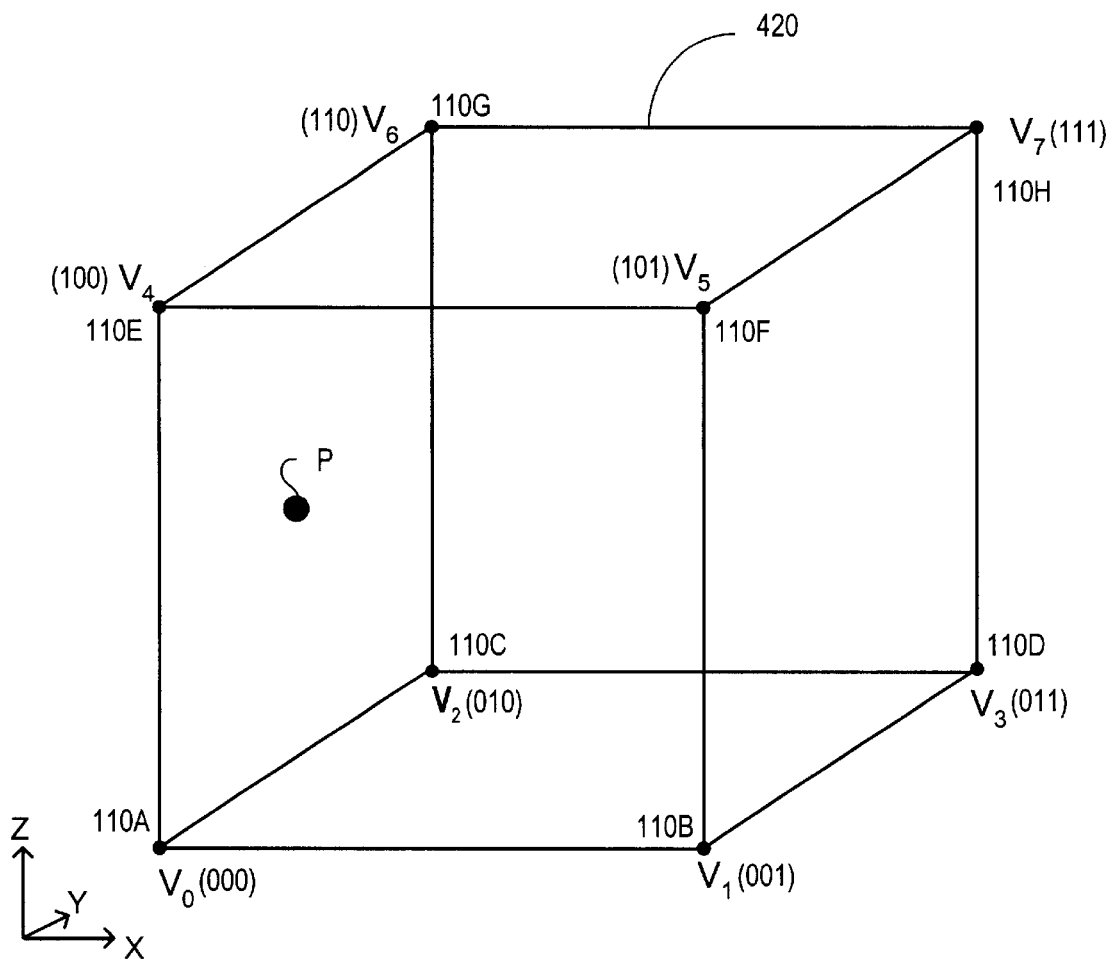
FIG. 4 shows indexed vertices for a unit cell in the color space shown in FIG. 1.

Referring to FIGS. 3 and 4, the reorder circuit 514 supplies the reordered lattice points 516A–516H to the interpolator 518. The lattice points 516A–516H represent corner vertices V0–V7 of the unit cube 420 in FIG. 4. Interpolator 518 uses the lower significant bits $R[3:0], G[3:0]$ and $B[3:0]$ as an index to identify a particular subregion between vertices V0–V7 containing input color point P. One technique for identifying the subregion is referred to as cubic subdivision.

Cubic subdivision may be viewed as creating a plurality of subcubes within unit cube 420. Cubic subdivision identifies smaller subcubes within unit cube 420 containing the input color point P. The process is repeated dividing the subcube into an even smaller cubic region containing the input color point P. Cubic subdivision is repeated until the volume of the subcube coincides with the input color point P.

Referring specifically to FIG. 4, the relative order of the vertices V0–V7 is used in cubic subdivision. The vertices V0–V7 are represented by binary numbers. Each digit of the binary number represents an zyx location where '0' is nearer the origin and '1' is away from the origin. For example, the lower-front-left vertex V0 is represented by binary value 000 and the lower-front-right vertex V1 is represented by the binary value 001. The binary values representing the other vertices V2–V7 are also shown in FIG. 4.

Figure 5:
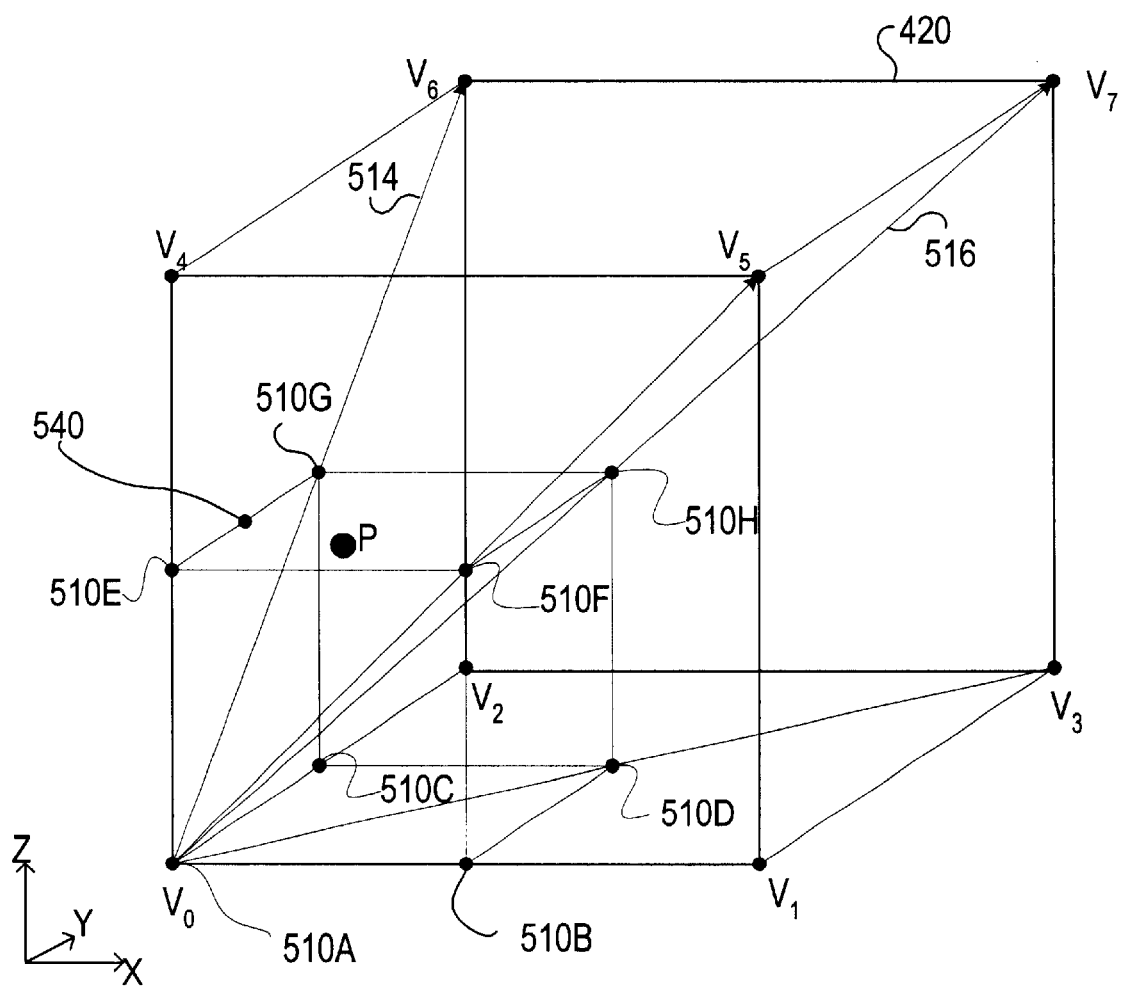
FIG. 5 shows how cubic subdivision is performed for the unit cell shown in FIG. 4.

Referring now to FIG. 5, a first iteration of cubic subdivision creates a first subcube 540. Interpolating half way between known data points V0–V7 creates the intermediate data points 510A–510H for subcube 540. The intermediate point 510G of subcube 540 is formed by interpolating between vertices V0 and V6. Alternatively, point 510G can be generated by interpolating between vertices V2 and V4. But in this example, the interpolations are performed between a first point V0 closest to the origin and a second point V6 "up-and-away-and-to-the-right" of the first point ("up-away-and-to-the-right" scheme).

By performing the interpolations using the "up-away-and-to-the-right" scheme, errors may be minimized relative to a neutral axis 516. The neutral axis extends from the origin at vertex V0 to the corner opposite the origin at vertex V7. This neutral axis 516 may represent the neutral colors or gray-scale intensity. The human eye may be more sensitive to the gray-scale intensities, and therefore, the errors relative to the neutral axis 516 may be reduced.

Figure 6:
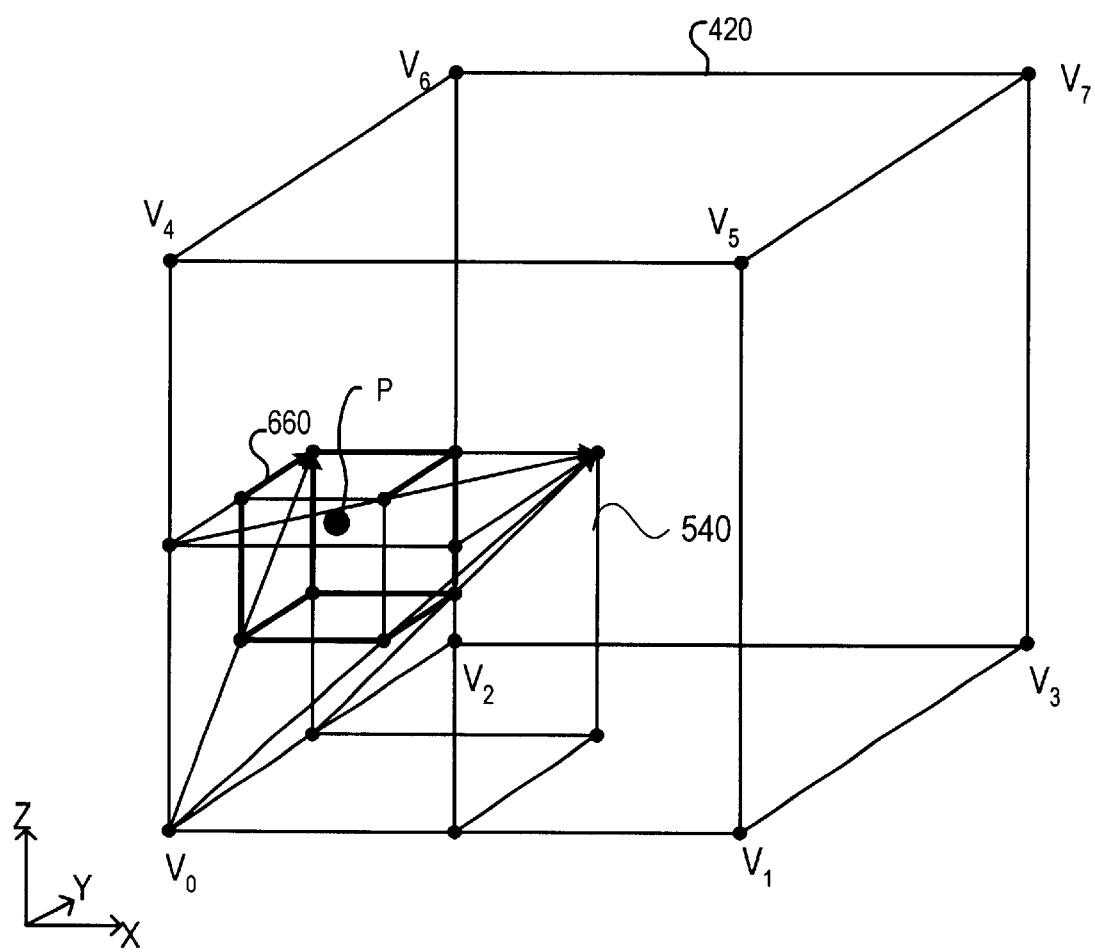
FIG. 6 shows further cubic subdivision for the unit cell shown in FIG. 5.

FIG. 6 shows a second iteration of cubic subdivision that defines a smaller subcube 660 containing input color point P. The vertices for the subcube 660 are determined by interpolating between the intermediate vertices identified for subcube 540. Additional iterations of cubic subdivision can be repeated until a volume of a subcube is identified that coincides with the input color point P.

Cubic Subdivision Indexing

Figure 7:
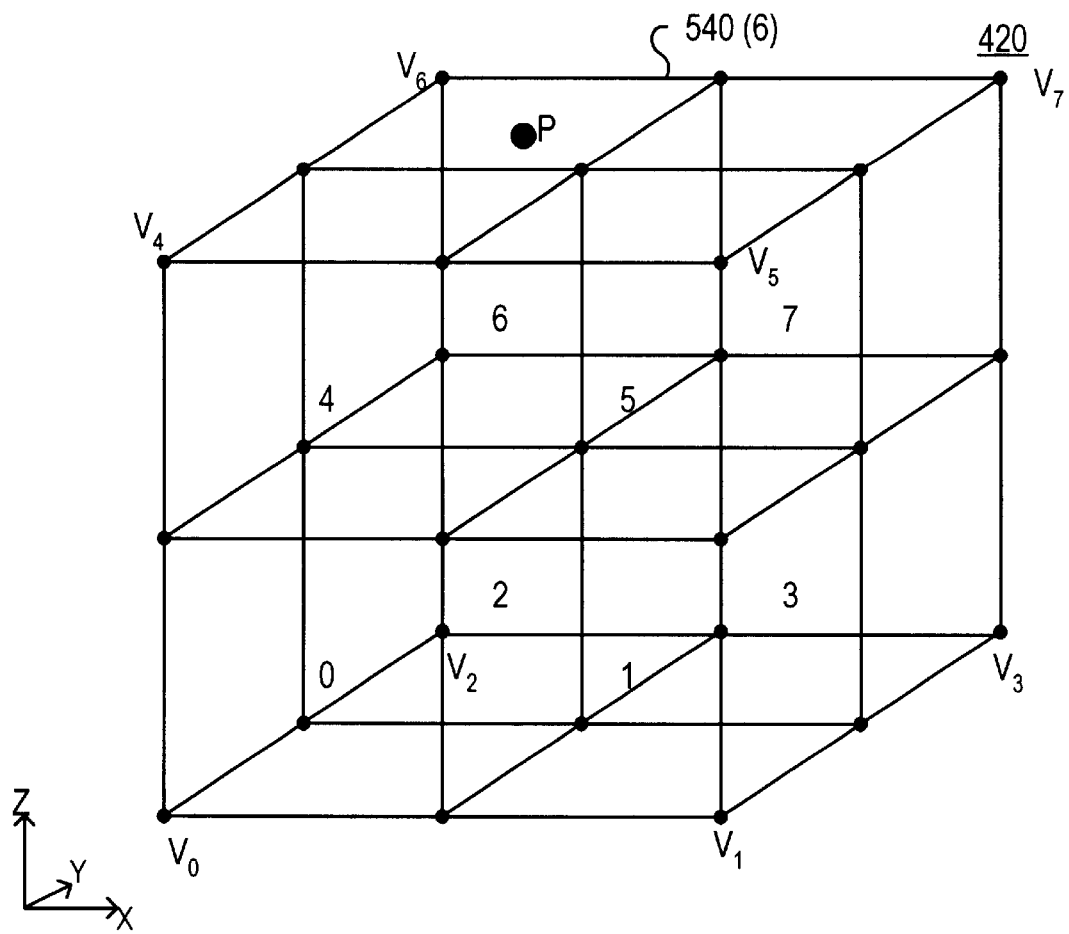
FIG. 7 shows an indexing scheme used for identifying subregions of the unit cell shown in FIG. 4.

FIG. 7 shows how subcubes of an initial unit cube 420, as well as subsequent subcubes, can be indexed similarly to the initial vertices (V0–V7). The index in one example is a binary number, with each digit representing a location in a "$zyx_2$" dimension. The subcube containing input color point P is identified according to which halves of the unit cube 420 contain input color point P.

The halves of the cube 420 closest to the origin V0 are assigned a binary 0 value and the halves farthest from the origin V0 are assigned a binary '1' value. As shown in FIG. 7, the lower-front left cube is assigned a value of 0, the lower-front-right cube is assigned a value of 1. The lower-back-left cube is assigned a value of 2 and the lower-back-right cube is assigned a value of 3. The next level of cubes in the upper half of cube 540 are assigned values 4–7 in a similar manner as shown in FIG. 7.

To explain further, the input color point P resides in the half of the unit cube 420 closest to the origin V0 in the x dimension, in the cube half furthest away from the origin in the y dimension, and in the cube half furthest away from the origin in the z dimension. Thus the binary expression $1_z 1_y 0_x$ ($P_6$) represents the subblock in the first cubic subdivision containing input color point P.

The location of the input point P can be expressed by a triplet of binary numbers (C, B, A). The term C represents the location of input color point P in the z direction relative to $V_0$. The term B represents the location of the input color point P in the y direction relative to $V_0$, and A represents the location of the input color point in the x direction relative to $V_0$. The most significant bits of C, B, and A, in that order, identify the first subcube.

For example, the terms C, B and A may be 4-bit binary numbers with the values: C=15 (1111), B=12 (1100), and A=5 (0101). In one example, the terms C, B and A correspond with input color values R, G, and B, respectively. The most significant bits for C, B and A yield the binary expression 110 (6 in base 10) for the first order index term. The second, third and fourth order index terms are represented by the binary strings 111, 100 and 101, respectively.

The first subcube P6 identified in FIG. 7 containing input color value P can be further subdivided using the second most significant bits '111' for binary numbers C, B and A. This result can again be subdivide using the third most significant bits '100' of C, B, and A. This process continues until the least significant bits '101' of C, B, and A determine an elemental subcube. The elemental subcube has the volume of a single point coinciding with input color point P.

Thus, assuming 4-bit values for C, B, and A, the input color point P is represented by the index $P_{i,j,k,l}$. The index i represents a subcube derived from the most significant bits of C, B, and A. The index j represents a subcube derived from the second most significant bits. Similarly, indices k and l represent the subcubes derived from the third and fourth significant bits of C, B, and A. The index $P_{6,7,4,5}$ represents the four iterations of cubic subdivision for the values of C, B and A described above. The index $P_{6,7,4,5}$ designates how the unit cube 540 is subdivided to derive an elemental subcube for input color value P.

In the system shown in FIG. 3, the four least significant bits R[3:0], G[3:0] and B[3:0] of the input RGB color value are used for interpolation. In this case, B[3:0] represents the z-axis, G[3:0] represents the y-axis and R[3:0] represents the x-axis. The most significant bits B[3], G[3], R[3] of the separate color portions are used to determine the index i for the first subcube 540 containing input color point P. Bits B[2], G[2], R[2] determine an index j, B[1], G[1], R[1] determine index k, and bits B[0], G[0], R[0] determined index l for $P_{i,j,k,l}$.

Figure 8:
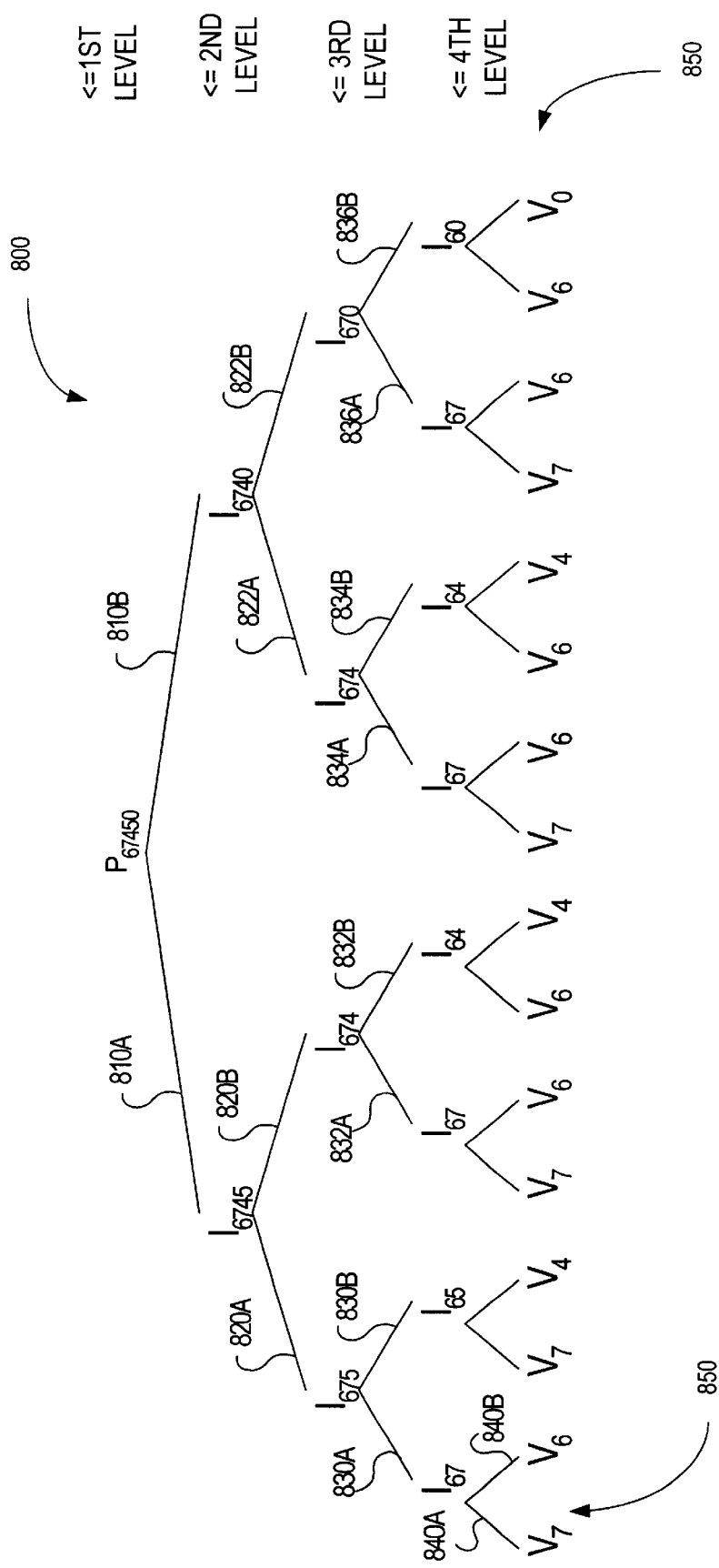
FIG. 8 shows an expansion tree created from an index identifying an input color point.

Referring to FIG. 8, with index $P_{i,j,k,l}$ for the identified elemental subcube is evaluated to determine the contents of P in terms of the vertices V0–V7. One example of subcube evaluation takes the form of a tree expansion with the elemental subcube $P_{i,j,k,l}$ used as a root expansion term. An additional index term of 0 is added to the root term and is expressed as $P_{i,j,k,l,0}$. In the example of FIG. 8, the root index term is $P_{67450}$. A first level of branching stemming from the base term $P_{67450}$ establishes left and right branches 810A and 810B. The left branch 810A and the right branch 810B generate intermediate expansion terms $I_{6745}$ and $I_{6740}$, respectively.

In this implementation, the two different branches use operands comprising the two right most (least significant) index terms of the root term $P_{i,j,k,l,0}$. Thus, the first level evaluation uses the two index terms 1, 0 from the subcube index $P_{i,j,k,l,0}$, as the operands for the branches 810A and 810B.

Along the left branch 810A, an expansion algorithm applies a bit-wise OR operation. For example, l=5=101 is ORed with 0=000 yielding an index value 5=101 for a new intermediate term $I_{6745}$. The right branch 810B applies a bit-wise AND operation. For example, binary value 101 is bit-wise ANDed with binary value 000 yielding a value 0=000 for intermediate term $I_{6740}$. The new intermediate terms $I_{6745}$ and $I_{6740}$ represent branches 810A and 810B, respectively. This first level expansion establishes base terms for a second level expansion.

In the second level expansion, first and second branches 820A and 820B are expanded from intermediate index $I_{6745}$ associated with branch 810A. Branches 822A and 822B are expanded from intermediate index $I_{6740}$ associated with branch 810B. The left branches again apply a bit-wise OR operation between operands for the two right most (least significant) index values. The right branches again apply a bit-wise AND operation to the two right most (least significant) index values.

For branch 820A, binary value 100 is ORed with binary 101 yielding binary value 101 (5 in base 10). For branch 820B, binary value 100 is ANDed with binary 101 yielding binary value 100 (4 in base 10). For branch 822A, binary value 100 is ORed with binary value 000 yielding binary value 100 (4 in base 10). For branch 822B, binary value 100 is ANDed with binary 000 yielding binary 000 (0 in base 10). The new intermediate index terms for branches 820A, 820B, 822A, and 822B in this example are $I_{675}$, $I_{674}$, $I_{674}$, and $I_{670}$, respectively.

Expansion continues through third and forth levels until only one digit remains for each index. The fourth level of branching generates end terms 850 for the tree expansion 800. For example, branches 840A and 840B generate vertices $V_7$ and $V_6$, respectively. With four levels of branching, the tree expansion 800 generates sixteen end terms 850. The end terms 850 represent weighted vertices of an interpolation summation. The end terms 850 identify which vertices V0–V7 are used from the unit cell 420 (FIG. 7) and how those vertices should be weighted to approximate the output color value associated with input color point P.

The number of levels of branching (i.e., expansion) can differ depending on the number of cubic subdivisions. In an alternative embodiment, the two least significant index values of the base terms provide the operands to left and right branches stemming from the base terms. Different logical operations may also be used on the index values $P_{i,j,k,l}$ to generate the different branches of the tree 800.

Interpolation Circuit

Figure 9:
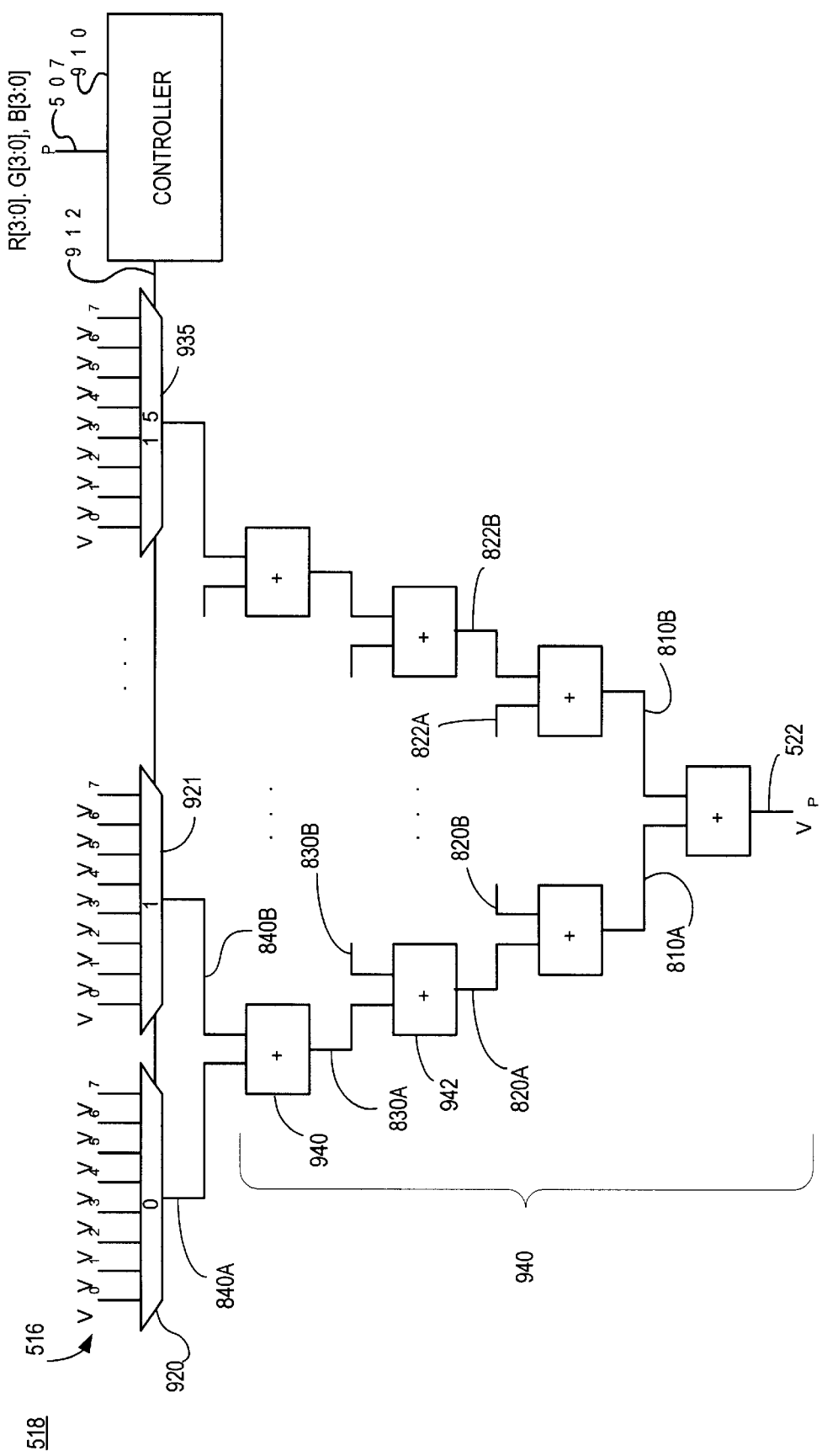
FIG. 9 is a block diagram showing an interpolator circuit implementing the expansion tree shown in FIG. 8.

FIG. 9 shows in detail the logic used in interpolator 518 (FIG. 3) for implementing the tree expansion 800 shown in FIG. 8. The vertices V0–V7 of the unit cell 420 output from the sample reorder circuit 514 in FIG. 3 provide inputs to a plurality of multiplexers 920–935. In AT this example, up to sixteen different multiplexers may be used to select from the different vertices V0–V7. This corresponds with the sixteen end terms 850 shown in FIG. 8. In one implementation, the last multiplexer 935 may not be necessary when vertex V0 is always the last end term 850 in expansion tree 800.

A controller 910 uses the R[3:0], G[3:0], and B[3:0] lower significant bits 507 of the input color value to generate the cubic subdivision index $P_{i,j,k,l}$. The controller 910 then expands the index $P_{i,j,k,l}$ to identify the vertices V0–V7 for the end terms 850 in FIG. 8. The end terms 850 identified by controller 910 are sent over output 912 to the multiplexers 920-935.

For the example tree structure 800 shown in FIG. 8, multiplexer 920 outputs vertex V7 as the end term identified by branch 840A. Multiplexer 921 outputs vertex V6 as the end term identified by branch 840B. The multiplexers 920–935 output sixteen vertices according to the end terms 850 identified by the expansion tree 800 shown in FIG. 8. These output vertices 516 are then fed into a summation circuit 940. It should be understood that the specific vertices output by the multiplexers 920–935 can vary depending on the input color value, the type of cubic subdivision and the type of tree expansion.

Summation circuit 940 adds together the vertices output by the multiplexers 920–935. The summation circuit 940 provides a summation averaging of the vertices that approximate of an output color value 522 corresponding to the input color point P in FIG. 7. An adder 940 adds together the two vertices output by mutiplexers 920 and 921. In the example shown in FIG. 8, adder 940 adds together vertices V7 and V6. An adder 942 adds together the result of adder 940 and the result of another adder (not shown) that adds together vertices V7 and V4. The remaining adders in the summation circuit 940 operate in a similar manner adding together the vertices and summations of vertices according to the tree expansion shown in FIG. 8.

In one example, each stage of adders in the summation circuit 940 includes an additional bit line. For example, adder 940 may have eight bit inputs lines and a nine bit output line. The adder 942 would then have two nine bit input lines and a ten bit output line. Of course the width of the input and output lines for both the multiplexers 920–935 and the summation circuit 940 depend on the number of bits used for the vertices 516.

Some or all of the different components of the color conversion circuit shown in FIGS. 3 and 9 can be part of the same integrated circuit or separate integrated circuits. The address generator 504, sample reorder circuit 514 and interpolator 518 can be implemented in software or hardware. For example, these elements may be implemented in software using a programmable processor or may be implemented in hardware using different discrete logic devices. The memories M0–M7 may be separately addressable memory devices or may be different sections of memory in the same memory device.

Additionally, readily-established circuits may be disclosed in simplified form (e.g., simplified blocks) in order to avoid obscuring an essence of the exemplary embodiments of the present invention. Likewise, to aid a clear and precise disclosure, description of their operations, such as timing considerations and the like, may be simplified when persons of ordinary skill in the art can readily understand their operations by way of the drawings and present disclosure.

Embodiments of the present invention include devices and methods that may include provisions for conversion of color data. In examples, the color conversion may have been described with reference to color data of a first RGB color space and that of a second CMYK color space. It should be understood, however, that the scope of the present invention encompasses any color space that needs transformation into another color space.

Additionally, specific examples may have referenced a "print" color space. Although, a "print" color space represents a common output domain, alternative embodiments may establish output color data for domains and uses other than printing.

Specific exemplary embodiments disclosed may have been described with reference to color spaces of equal dimension. For example, exemplary embodiments may use R, G, B coordinate axes for a first color space and C, M, Y, K coordinate axes for a second color space. However, the dimensional order of the input and output color spaces do not have to be the same. For example, the second (print) color space may comprise four dimensions that include C, M, Y and black (K) coordinate axes. It should also understood that the scope of the present invention encompasses subdivision of a region outlined by the vertices using "alternative shapes" as may be used for alternative n-dimensional domains.

It may be apparent to those skilled in this art that the disclosed embodiments are exemplary and that various changes and modifications may be made thereto as become apparent by the present disclosure. Accordingly, such changes and modifications are considered to fall within the scope of the appended claims.

What is claimed is:

1. A method for interpolating color values in a color space, comprising:
    identifying the neighboring vertices in the color space forming a unit cube containing the input color value;
    indexing a position of an input color value in the color space relative to neighboring vertices using cubic subdivision by assigning a binary '0' value to halves of the unit cube in an x, y, or z dimension closest to an origin of the unit cube and assigning a binary '1' value to halves of the unit cube in the x, y, or z dimension furthest from the origin;
    selecting a group of vertices from the unit cube according to the indexed position of the input color values for generating the output color value;
    expanding the indexed position of the input color value relative to the neighboring vertices; and
    interpolating between the neighboring vertices together according to the expanded indexed position to generate an output color value.

2. A method according to claim 1 including:
    using upper significant bits of the input color value to identify the vertices for the unit cube containing the input color value; and
    using lower significant bits of the input color value to index the position of the input color value within the unit cube.

3. A method according to claim 1 including using n-bits of C[n-1:0], B[n-1:0] and A[n-1:0] color parameters for generating the index values in $i_{n-1}, i_{n-2}, i_{n-3} \ldots i_0$, where $$i_{n-1} = C[n-1]B[n-1]A[n-1],$$

$$i_{n-2} = C[n-2]B[n-2]A[n-2],$$

$$\vdots$$

$$\vdots$$

$$i_0 = C[0]B[0]A[0]; \text{ and}$$

expanding out the index values to identify what neighboring vertices to combine together to estimate the output color value.

4. A method according to claim 3 including expanding out the index values by:
    bit-wise ORing pairs of the index values to form a first set of intermediate index values;
    bit-wise ANDing the pairs of the index values to form a second set of intermediate index values; and
    repeatedly bit-wise ORing and ANDing pairs of the intermediate index values until only single index values exist.

5. A method according to claim 4 including combining the neighboring vertices together by summing together the vertices identified by the expanded index values.

6. An interpolator, comprising:
    a device configured to receive vertices of a color space neighboring an input color value, the device to generate an index identifying a subcube of the color space containing the input color value by:
    identifying the neighboring vertices in the color space forming a unit cube containing the input color value;
    indexing a position of an input color value in the color space relative to neighboring vertices using cubic subdivision by assigning a binary '0' value to halves of the unit cube in an x, y, or z dimension closest to an origin of the unit cube and assigning a binary '1' value to halves of the unit cube in the x, y, or z dimension furthest from the origin; and
    selecting a group of vertices from the unit cube according to the indexed position of the input color values for generating the output color value; and
    using the index for selecting the neighboring vertices for interpolation to generate an output color value.

7. An interpolator according to claim 6 wherein the device includes a controller for generating the index and identifying the neighboring vertices according to the index.

8. An interpolator according to claim 7 wherein the controller identifies the neighboring vertices by generating an expansion tree that expands out different terms in the index.

9. An interpolator according to claim 8 wherein the device includes multiplexer logic for outputting the neighboring vertices identified by the controller.

10. An interpolator according to claim 9 wherein the device includes a summation circuit for combining together the vertices output by the multiplexer logic.

11. An interpolator according to claim 10 wherein the summation circuit includes multiple adder stages each representing a different level of the expansion tree derived from the index.

12. An interpolator according to claim 6 wherein the device generates the index for the subregion according to the following:

$$i_{n-1}=C[n-1]B[n-1]A[n-1],$$

$$i_{n-2}=C[n-2]B[n-2]A[n-2],$$

$$i_0=C[0]B[0]A[0],$$

where $i_{n-1}, i_{n-2} \ldots i_0$, represent index terms of the identified subregion and C[n-1:0], B[n1:0] and A[n-1:0] represent n-bits of a color space having at least three different color parameters identified by the variables C, B, and A.

13. An interpolator according to claim 12 wherein the device expands out the index by performing logical operations on pairs of the index terms until only single index terms exist identify the neighboring vertices.

14. An interpolator according to claim 13 wherein the C variable corresponds with a z-axis of the color space, the B variable corresponds with a y-axis of the color space, and the A variable corresponds with an x-axis of the color space.

15. A color converter, comprising:
   an input receiving vertices for a primary region of the color space surrounding an input color value; and
   a controller to:
   identify the neighboring vertices in the color space forming a unit cube containing the input color value;
   index a position of an input color value in the color space relative to neighboring vertices using cubic subdivision by assigning a binary '0' value to halves of the unit cube in an x, y, or z dimension closest to an origin of the unit cube and assigning a binary '1' value to halves of the unit cube in the x, y, or z dimension furthest from the origin;
   select a group of vertices from the unit cube according to the indexed position of the input color values for generating the output color value; and
   using tree expansion of the identified subregion for identifying how the vertices of the primary region are used to generate an output color value.

16. A color converter according to claim 15 including:
   one or more memories for storing vertices for the color space; and
   an address generator for identifying the vertices in the memories for the primary region of the color space.

17. A color converter according to claim 15 wherein the controller uses tree expansion by stemming branches from a pair of terms identifying the subregion, a first one of the branches generated by bit-wise ANDing the pair of terms and a second one of the branches generated by bit-wise ORing the pair of terms.

* * * * *

UNITED STATES PATENT AND TRADEMARK OFFICE
CERTIFICATE OF CORRECTION

PATENT NO. : 6,801,212 B1
DATED : October 5, 2004
INVENTOR(S) : Eldredge

It is certified that error appears in the above-identified patent and that said Letters Patent is hereby corrected as shown below:

Column 4,
Line 24, replace "return (y' 4>C4)" with -- return (y'%4>C4) --.

Column 8,
Line 20, replace "In AT this example," with -- In this example, --.

Signed and Sealed this

Seventh Day of February, 2006

JON W. DUDAS
*Director of the United States Patent and Trademark Office*